United States Patent [19]

Staege

[11] 4,169,133
[45] Sep. 25, 1979

[54] PROCESS FOR RECOVERING ACIDIC GASES COLLECTED DURING GAS DESULFURIZATION

[75] Inventor: Hermann Staege, Essen, Fed. Rep. of Germany

[73] Assignee: Krupp-Koppers GmbH, Essen, Fed. Rep. of Germany

[21] Appl. No.: 869,854

[22] Filed: Jan. 16, 1978

[30] Foreign Application Priority Data

Feb. 8, 1977 [DE] Fed. Rep. of Germany ....... 2705056

[51] Int. Cl.² ....................... C01B 31/22; B01D 53/34
[52] U.S. Cl. ..................................... 423/437; 423/220; 423/522; 423/563; 423/573 R; 55/23; 62/12; 62/23; 62/31
[58] Field of Search ............... 423/210, 220, 437, 563, 423/522, 571, 573; 55/23, 24; 62/11, 12, 23, 31, 34

[56] References Cited
U.S. PATENT DOCUMENTS

| 2,996,891 | 8/1961 | Tung | 62/12 |
|---|---|---|---|
| 3,074,245 | 1/1963 | Becker | 62/12 |
| 3,224,208 | 12/1965 | Schlumberger et al. | 62/12 |
| 3,290,890 | 12/1966 | Bray et al. | 62/12 |
| 3,966,875 | 6/1976 | Bratzler et al. | 423/220 |

Primary Examiner—Earl C. Thomas
Attorney, Agent, or Firm—Michael J. Striker

[57] ABSTRACT

The invention relates to a process for recovering the sulfur components of acidic gases collected by gas desulfurization. The inventive concept is to first compress a stream of the acidic gas (known as "acid gas") up to a pressure of 8.00 to 12.00 atmospheres absolute. Then this compressed stream of gas is cooled to −35° to −45° C. The pressure on this cooled gas is reduced to a pressure of 1.05 to 2.00 atmospheres absolute. Subsequently, the gas is further cooled to a temperature of −55° to −65° C. Finally, the resulting mixture is conducted to a separator where frozen solid constituents are separated from the gaseous constituents. The gaseous constituents include substantially all of the sulfides produced during the gas desulfurization and the frozen solid particles consist essentially of carbon dioxide.

6 Claims, 1 Drawing Figure

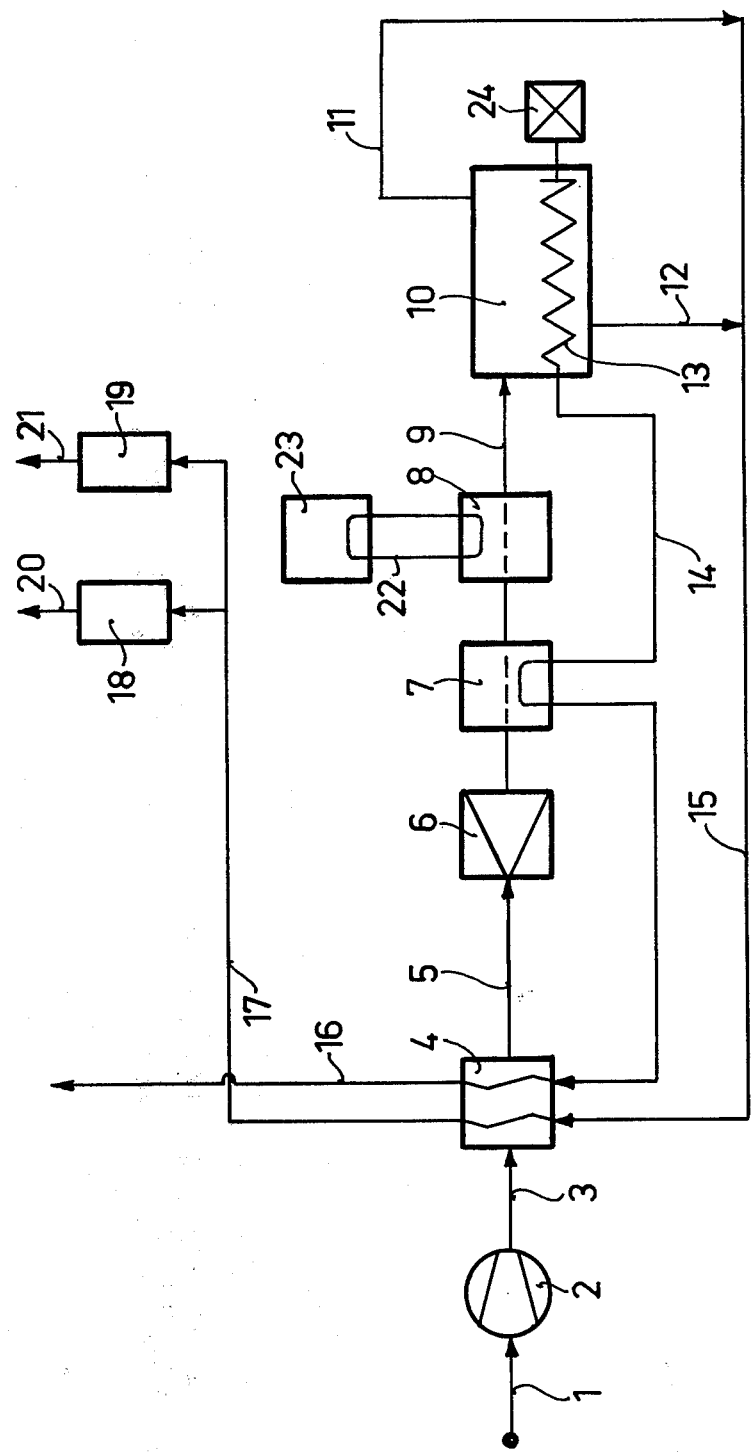

PROCESS FOR RECOVERING ACIDIC GASES COLLECTED DURING GAS DESULFURIZATION

BACKGROUND OF THE INVENTION

The invention relates to a process for recovering acidic gases collected by gas desulfurization. These acidic gases (which are sulfides) are either thermally dissociated in a Claus furnace or are transformed into sulfuric acid, Solid and liquid hydrocarbon-containing fuels generally contain sulfur. With gasification of the fuel, hydrogen sulfide, $H_2S$, and carbon oxysulfide, COS, are formed. The gasification is generally intended to produce hydrogen, and synthesis gas or reactants used for the oxo process. The presence of the sulfide gases is a considerable impediment to subsequent processes using the intended gases. Consequently, these sulfides must be removed by an appropriate scrubbing process. The thus-isolated sulfur-containing compounds are environmental hazards, so they cannot be discharged into the atmosphere after being separated from the scrubbing solution. Consequently, the $H_2S$ and COS are customarily either dissociated to elementary sulfur in a Claus furnace or converted to sulfuric acid.

The disadvantages of the conventional art is that on one hand not all gas desulfurization processes are equally well suited for the simultaneous removal of $H_2S$ and COS, and on the other hand, the processes fulfilling this prerequisite also simultaneously scrub a relatively high portion of carbon dioxide from the stream of gas being scrubbed.

Then a so-called "acid gas" forms with distillation of the changed scrubbing solution. This acid gas has a relatively small hydrogen sulfide and carbon oxysulfide content but has a very large carbon dioxide content. Typically, the composition of such an acid gas is:

| |
|---|
| 7% by volume of $H_2S$ |
| 1% by volume of COS |
| 92% by volume of $CO_2$. |

The $H_2S$ and COS content can be even below these percentages, depending on the particular scrubbing process used. Therefore, the $CO_2$ scrubbed from the gas flow can be up to 15 times greater than the amount of sulfides.

On account of its low $H_2S$ content, the carbon dioxide-diluted acid gas is non-combustible and cannot be simply burned with stoichiometric amounts of air to form sulfur dioxide (subsequently reacted to form sulfuric acid) and water vapor in accordance with the equation:

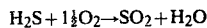

$$H_2S + 1\tfrac{1}{2}O_2 \rightarrow SO_2 + H_2O$$

or to form elemental sulfur and water vapor in accordance with the equation:

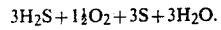

$$3H_2S + 1\tfrac{1}{2}O_2 \rightarrow 3S + 3H_2O.$$

In order to overcome this disadvantage, it has been proposed that the acid gas liberated from the scrubbing solution be subjected to a further selective scrubbing for the purpose of enriching the $H_2S$ content. The disadvantage of a second absorption process is that this normally must be performed in several stages; the selectivity of the charged scrubbing medium as a rule is insufficient for attaining the requisite $H_2S$ concentration in a single step. Therefore, this proposal involves a particularly high apparatus expense as well as high operational costs.

In practice, the conventional art mixes the acid gas with a combustible gas having a high heating value. The resulting mixture is then burned with pure oxygen.

If elementary sulfur is desired, then a certain amount of the elementary sulfur is recycled back through the Claus furnace and is burned together with the mixture of acid gas and combustible gas. The reconducted amounts of sulfur can amount to a multiple of the amount of sulfur contained in the acid gas in the form of $H_2S$ and COS.

Resorting to the addition of the combustible gas and the pure oxygen means additional expense. This economic disadvantage is accompanied by less output. The recirculation and burning of sulfur in the Claus furnace results in a reduction in the yield of sulfur as well as increased pollution due to a higher sulfur content in the waste gases of the Claus furnace.

SUMMARY OF THE INVENTION

An object of this invention is to provide a process which obviates the above-mentioned difficulties involved in subsequent treatment of acid gas in either a Claus furnace or a sulfuric acid producing installation. This new process is particularly distinguished by its economical and technologically efficient recovery and concentration of sulfide gases.

The inventive concept is to sequentially:

(a) compress the stream of acid gas up to a pressure of 8.00 to 12.00 kg/cm² (atmospheres absolute);

(b) cooling the compressed stream of gas to a temperature from −35° to −45° C.;

(c) reducing the pressure on the cooled gas to a pressure of from 1.05 to 2.00 kg/cm²;

(d) again cooling the gas to a temperature of −55° to −65° C.; and (e) conducting the resulting mixture of gaseous and solid constituents to a separator in which the $CO_2$ is separated in the form of carbon dioxide snow from the gaseous $H_2S$ and COS and then conducting the gaseous $H_2S$ and COS into either a Claus furnace or a sulfuric acid producing installation.

The carbon dioxide could be frozen by lowering the temperature to −79° C. or below atmospheric pressure—as long as the temperature is above the freezing point of hydrogen sulfide and carbon oxysulfide. With compression, the carbon dioxide can be frozen out at higher temperatures of −35° to −65° C.

The inventive process then provides that a gaseous fraction consisting of $H_2S$ and COS is separated from the acid gas prior to subsequent treatment of the sulfides. Essentially only these fractions are conducted into either the Claus furnace or the sulfuric acid producing installation. The carbon dioxide portion of the acid gas is simultaneously separated as dry ice and, if desired, this carbon dioxide can likewise be supplied to an appropriate utilization. Residual liquid components may be drawn off into the same conduit with the $H_2S$ and COS. Then the $H_2S$ and COS portions of the gaseous fraction altogether are on the order of magnitude of about 70–80% by volume—therefore, this gas can be burned with air without difficulty and without supplementary heating in either the Claus furnace or the sulfuric acid producing installation.

BRIEF DESCRIPTION OF THE DRAWING

The single FIGURE illustrates a flow diagram which is explanatory of the invention.

DETAILED DESCRIPTION OF A PREFERRED EMBODIMENT

The inventive concept is further illustrated by the flow chart of the drawing. This flow chart shows a schematic drawing of an apparatus used to perform the inventive process. Secondary equipment which does not directly serve to explain the process is not illustrated.

The acid gas collected by a desulfurization of gas is conducted by an unillustrated drive through conduit 1 to compressor 2. Within compressor 2 the acid gas is compressed to an absolute pressure in atmospheres of 8.00 to 12.00 (kg/cm$^2$). The acid gas subsequently arrives by way of conduit 3 in the heat exchanger 4. Here the compressed gas is cooled to a temperature of from $-35°$ to $-45°$ C.—this condenses the $CO_2$ present in the gas. The now-liquid $CO_2$ with the dissolved other gas components arrives subsequently through conduit 5 to an expansion installation 6. Here the pressure is reduced and the liquid is expanded to a vapor and snow—the pressure in the expansion installation 6 is from 1.05 to 2.00 atmospheres absolute (kg/cm$^2$); this pressure transforms a large part of the liquid $CO_2$ to $CO_2$—snow. Passing through heat exchanger 7 and the cooler 8, the expanded gas is further cooled to a temperature of $-55°$ to $-65°$ C., so that even more of the left over carbon dioxide is converted to dry ice.

The mixture of dry ice and gas then leaves the cooler 8 by way of conduit 9 and arrives at the separator 10 in which the dry ice is separated from the gas. The gaseous fraction, consisting essentially of $H_2S$ and COS, is drawn off through conduit 11 located in the upper part of separator 10. Simultaneously, the separated dry ice is pressed through the screw conveyor 13 located in the lower part of the separator 10 into conduit 14. It is possible to draw off residual liquid gas components through conduit 12 which is likewise located in the lower part of separator 10.

Conduit 14 extends first through heat exchanger 7 where the expanded gas streaming to the separator 10 is cooled. There, the dry ice in conduit 14 is simultaneously warmed; consequently the dry ice sublimates. Subsequently, this vaporized $CO_2$ arrives at heat exchanger 4 where the $CO_2$ is further warmed with the compressed acid gas. The $CO_2$ can then be supplied to further applications or can be released into the atmosphere. Of course the $CO_2$ can also be drawn off in the form of dry ice directly from conduit 14.

The gaseous fraction, essentially being only $H_2S$ and COS, is led by conduit 11 into the conduit 15, which likewise leads into the heat exchanger 4. Also, conduit 12 empties into conduit 15; the residual fluid gaseous components were drawn out of separator 10 into this conduit 12. As they pass heat exchanger 4, the $H_2S$ and COS fractions coming out of conduit 15 are further warmed with the heat generated from the compressed acid gas. The $H_2S$ and COS fractions are then conveyed by way of conduit 17 to either Claus furnace 18 or sulfuric acid producing installation 19. Both the furnace and the installation operate in accordance with conventional principles, so details of their construction and manner of operation are not particularly pertinent to the explanation of this inventive concept. The final product, be it elemental sulfur or sulfuric acid, can be drawn off through conduits 20.

Cooler 8 is connected by way of the cooling medium circulator 22 to the refrigerator 23 which produces the requisite refrigeration. Motor 24 provides the drive of screw conveyor 13.

The advantages of the inventive process are implicitly apparent in the comparative tests below—these tests serve as Examples of a working embodiment of the inventive concept.

In both of the following tests, 20,000 Nm$^3$/h of acid gas are converted in a Claus furnace to elementary sulfur. The composition of the acid gas evolved by desulfurization is:

| | |
|---|---|
| $CO_2$ | 91% by volume |
| $H_2S$ | 7% by volume |
| COS | 1% by volume |
| $CO + N_2 + H_2$ | 1% by volume |

TEST A—The Conventional Technique

The acid gas of the foregoing composition is treated by a conventional method. That is the acid gas is subjected only to treatment in a Claus furnace after the acid gas is evolved. The Claus furnace is provided with supplementary heating which operates with pure oxygen. In addition, a quantity of sulfur must be fed back and burned with the acid gas. This amounts to a multiple of the introduced amounts of sulfur. In this case, the conventional process has the following characteristics:

| | |
|---|---|
| Quantity of Gas to the Claus Furnace | 20,000 Nm$^3$/h |
| Combustible gas fo supplementary heating | 3,045 Nm$^3$/h |
| Oxygen for supplementary heating | 3,320 Nm$^3$/h |
| Power | 600 kwh/h |
| Yield of sulfur, about 88% pure | 2,013 kg/h |
| Pollutant sulfur mixed with waste gases | 275 kg/h |

TEST B—The Inventive Process

Here, the acid gas is first subjected to the inventive recovery and only the enriched $H_2S$ and COS fractions are supplied to the Claus furnace. Part B has the following characteristics:

| | |
|---|---|
| Amount of gas to the Claus furnace with 1,600 Nm$^3$/h H S + COS, the rest being $CO_2 + CO + N_2 + H_2$ | 2,200 Nm$^3$/h |
| No combustible gas used for a supplementary heating | |
| No oxygen used for a supplementary heating | |
| Power for the Claus furnace | 210 kWh |
| Power for acid gas compressor about | 2,200 Kwh/h |
| Power for refrigerator installation about | 1,200 kWh/h |
| Sulfur yield - 97% pure about | 2,220 kg/h |
| Pollutant sulfur mixed with waste gases about | 68 kg/h |

A cost analysis of Tests A and B:

The costs of the Claus furnace used to perform Test A were more than twice as high as the costs for the Claus furnace to perform Test B. While Test B additionally required a refrigeration unit, still the expense for the total apparatus used was about 10–15% below the corresponding apparatus expense of Test A. This means that the installation used to perform test B is about $440,000–880,000 cheaper than the installation of Test A.

Similarly, the expenses of operation of Test B are considerably cheaper than those of Test A. The expense per hour of operation of Test B was about 35% below the corresponding costs of Test A. In practice this means that the process used in Test B saves about $110–$132 per hour of operation.

The substantial advantages of the inventive process are summarized below:
smaller equipment costs;
lower operational costs;
higher sulfur yield; and
lower pollution due to less sulfur content in the waste gases of the Claus furnace.

While the invention has been illustrated and described as embodied in a process for recovering acid gases, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A process for recovering sulfides collected during gas desulfurization, the process comprising the sequential steps of:
    gasifying a hydrocarbon-containing fuel and thereby obtaining a gas containing incidental quantities of carbon dioxide and sulfides;
    scrubbing the gas to form a purified gas and an absorbent solution containing absorbed sulfide and carbon dioxide, regenerating the absorbent solution to form an acid gas having constituents including the sulfides as well as incidental high quantities of carbon dioxide;
    compressing the constituents of the acid gas to a pressure of 8.00 to 12.00 atmospheres absolute;
    cooling the compressed constituents to a temperature of $-35°$ to $-45°$ C.;
    expanding the cooled constituents to a pressure of 1.05 to 2.00 atmospheres absolute;
    cooling the expanded constituents to a temperature of $-55°$ to $-65°$ C. to thereby solidify carbon dioxide to form a mixture of gaseous constituents and solid carbon dioxide; and
    separating solid carbon dioxide from the gaseous constituents, whereby a gas consisting essentially of sulfides is obtained.

2. The process of claim 1, said step of cooling to $-55°$ to $-65°$ C. resulting in the formation of a mixture of the gaseous constituents, the solid carbon dioxide and a liquid fraction; and further comprising the steps of separating the liquid fraction from the solid carbon dioxide and adding the liquid fraction to the gas consisting essentially of sulfides.

3. The process of claim 1, said step of cooling to $-35°$ to $-45°$ C. being performed by removing heat from the compressed constituents and transferring at least part of the removed heat to the gaseous constituents separated from the solid carbon dioxide.

4. The process of claim 1, said step of cooling to $-35°$ to $-45°$ C. being performed by removing heat from the compressed constituents and transferring at least part of the removed heat to the solid carbon dioxide separated from the gaseous constituents, whereby the carbon dioxide sublimates.

5. The process of claim 1, further comprising converting the sulfides of the gaseous constituents to sulfur.

6. The process of claim 1, further comprising converting the sulfides of the gaseous constituents to sulfuric acid.

* * * * *